(12) United States Patent
Brandt (10) Patent No.: US 11,215,548 B1
(45) Date of Patent: Jan. 4, 2022

(54) METHOD AND APPARATUS FOR MASK TESTING

(71) Applicant: Richard A. Brandt, New York, NY (US)

(72) Inventor: Richard A. Brandt, New York, NY (US)

(*) Notice: Subject to any disclaimer, the term of this patent is extended or adjusted under 35 U.S.C. 154(b) by 0 days.

(21) Appl. No.: 17/410,367

(22) Filed: Aug. 24, 2021

Related U.S. Application Data (60) Provisional application No. 63/155,645, filed on Mar. 2, 2021.

(51) Int. Cl.
  *G01N 15/08* (2006.01)

(52) U.S. Cl.
  CPC ....... *G01N 15/0806* (2013.01); *G01N 15/082* (2013.01); *G01N 2015/084* (2013.01)

(58) Field of Classification Search
  CPC .... G01N 15/00; G01N 15/08; G01N 15/0806; G01N 15/082; G01N 2015/084
  See application file for complete search history.

(56) References Cited

FOREIGN PATENT DOCUMENTS

| CN | 105954176 A | * | 9/2016 | ............. G01N 15/08 |
|---|---|---|---|---|
| CN | 111650109 B | * | 2/2021 | ............. G01N 15/08 |

* cited by examiner

*Primary Examiner* — Nguyen Q. Ha
(74) *Attorney, Agent, or Firm* — R. Neil Sudol; Henry D. Coleman (57) ABSTRACT

A face mask or a sample of air-permeable sheet material thereof is moved through a chamber containing a stationary particle-imbedded aerosol. A drive mechanism is preferably operatively connected to a mask holder or supporting shuttle for sliding the shuttle and the mask material along a linear path or a circular path. An aerosol supply and a photodetector are connected to a container that defines the chamber and communicate with the chamber.

20 Claims, 5 Drawing Sheets

METHOD AND APPARATUS FOR MASK TESTING

FIELD OF THE INVENTION

The present invention pertains to a method and an associated apparatus for determining the effectiveness of a facial mask in blocking airborne particulates from entering the lungs of a user via breathing.

BACKGROUND OF THE INVENTION

In general, an effective testing device that measures the performance of a class of objects must satisfy three conditions. (1) The test must be relevant. It must approximately replicate the way that the objects are used in practice. (2) The test must be accurate. The performance metrics must be measurable with a statistical error that is small enough to distinguish different objects. (3) The test must be repeatable. Measurements of identical objects, and re-measurements of the same object, must give the same metric value within the stated error range.

Great care is required to satisfy the above conditions while using the existing testing protocols (FDA ASTM standards F2299 and F3502, CDC-NIOSH 42CFR84 standard, etc.) for measuring facemask filtration efficiency (E). In these protocols, E is evaluated by measuring the percentage of encountered moving particles that are intercepted by the mask or mask material. This is done by impacting the mask or air-permeable film or sheet material of the mask with an aerosol containing airborne particulates, propelling the airborne particulates through the mask or material at a specific airflow velocity, and measuring the particle concentration both upstream and downstream of the mask or material. The penetration ratio R of the concentration downstream to upstream determines the filtration efficiency $E=(1-R) \cdot 100\%$. To effectively determine and compare efficiencies, the moving particle concentration and the upstream and downstream airflow velocities must be accurately measured and maintained, and the upstream and downstream particle counters must be accurately coordinated and able to function in a moving air stream. This requires the incorporation of sophisticated and expensive laboratory equipment, including compressors, pumps, condensers, nozzles, mufflers, pressure reducers, flow valves, and flowmeters.

Figure 1:
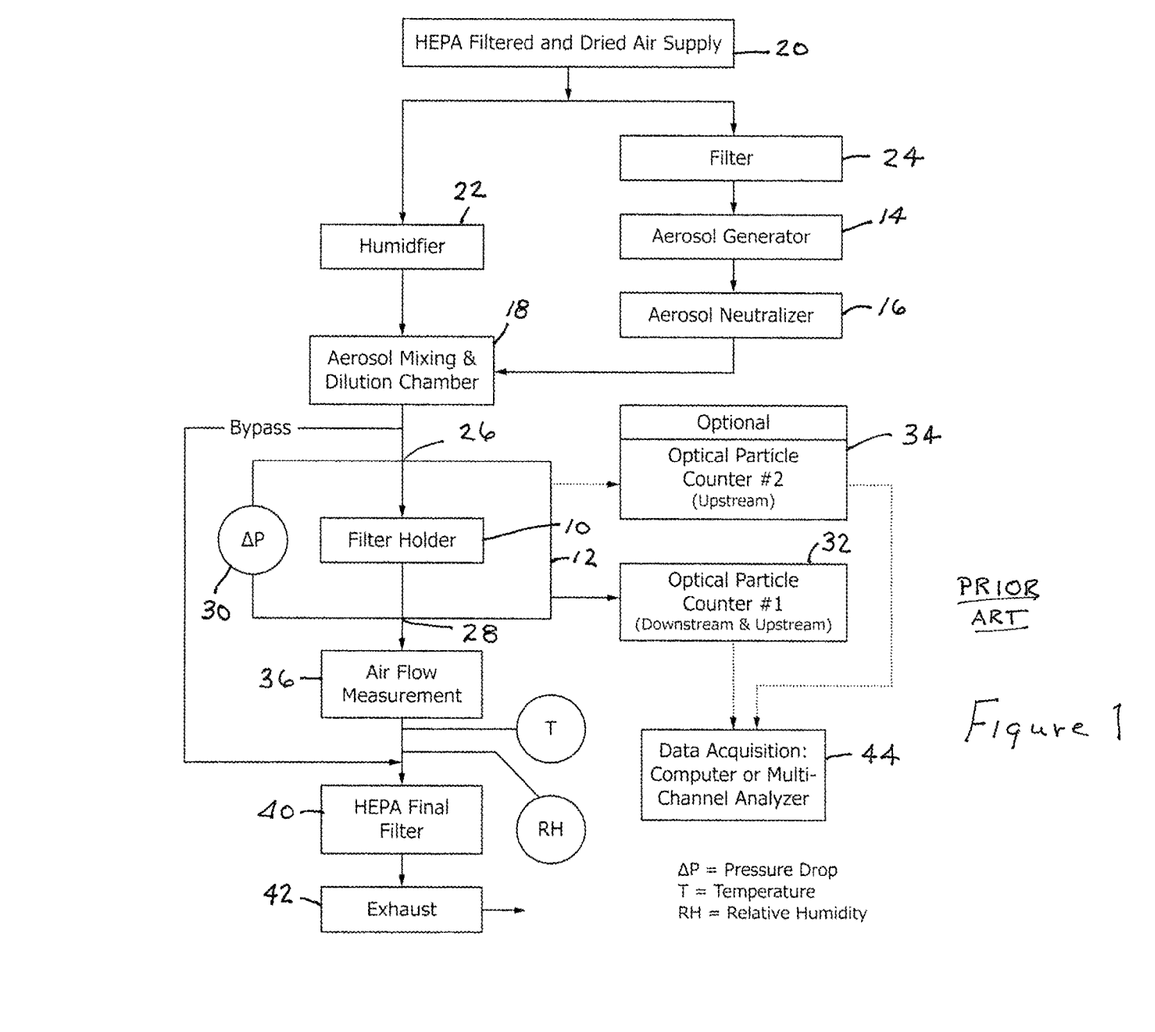
FIG. 1 is a block diagram of a conventional apparatus for testing the efficacy of a face mask or other air filtration device.

A typical laboratory configuration is illustrated in FIG. 1. A filter mask to be tested is attached to a holder 10 and placed therewith inside a container 12. Container 12 is connected at an upstream side of the filter/mask and the holder 10 to an aerosol generator 14 via a neutralizer 16 and a mixing and dilution chamber 18. Aerosol generator 14 and chamber 18 receive filtered and dried air from a HEPA supply 20. A humidifier 22 is provided between HEPA supply 20 and the mixing and dilution chamber 18, while an auxiliary filter 24 may be disposed between HEPA supply 20 and aerosol generator 14.

Aerosol generator 14 produces a particulate-containing air stream fed to container 12 under the action of a blower or vacuum pump 42 at a downstream end of the apparatus. A pressure difference or gradient arises between an upstream side 26 and a downstream side 28 of the filter or mask disposed on holder 10. A pressure transducer 30 is typically connected to container 12 to measure a pressure drop across the test filter or mask. Particle counters such as one or more optical detectors or photocells 32 and 34 are connected to container 12 for measuring particle concentrations on the upstream side 26 and downstream side 28 of the holder 10.

A flow meter 36 is located downstream of container 12 for measuring air flow rate through the test filter or mask. Additional sensors T and RH may be provided in an outlet conduit 38 for measuring temperature and relative humidity, respectively. A HEPA filter 40 and exhaust fan or vacuum pump 42 pulls the aerosol through the system and releases the air from the testing apparatus back into the environment. A programmed computer or multi-channel data analyzer 44 is connected to optical detectors or photocells 32 and 34 for monitoring, storing and processing the particle count data therefrom.

OBJECTS OF THE INVENTION

It is an object of the present invention to provide an improved mask testing system.

It is a more particular object of the present invention to provide an improved mask testing system that is at least as relevant, consistent, and repeatable as conventional systems.

A further particular object of the present invention to provide an alternative mask testing system that is simpler, less expensive, and more accurate than conventional systems.

These and other objects of the present invention will be apparent from the drawings and descriptions herein. While any particular embodiment might achieve less than all of the objects of the invention, it is believed that all the objects are attained collectively in various embodiments.

SUMMARY OF THE INVENTION

The present invention contemplates moving a mask (or a sample of the air-permeable sheet material thereof) through a chamber containing a stationary particle-imbedded aerosol instead of forcing the aerosol through a stationary mask. Other things (such as particle size and concentration) being equal, moving a mask through an aerosol chamber at a given speed $\underline{v}$ is physically equivalent to moving the aerosol onto the mask at the same speed $\underline{v}$, and the mask efficiency measured in either system will be exactly the same. (In the stationary mask test, an observer moving forward towards a mask with the same speed as the airflow will observe the mask moving backward through an aerosol at rest. Since physical results are independent of an observer's coordinate system, the tests are equivalent.)

There are many advantages to using such a stationary aerosol system to test masks. These include:

1. The speed of a moving mask holder is easy to precisely set and maintain (e.g., by using an electric motor) and can be sustained with great accuracy. Measuring and maintaining an aerosol flow speed is, on the contrary, very difficult, requiring pumps, control valves, flowmeters, etc. And even when using this equipment an accuracy error of +/−2.5% is claimed.

2. In a moving aerosol, particle concentration and stability are difficult to maintain, requiring specialized valves and regulators. Constant concentration is automatic in a stationary aerosol, as per the present invention.

3. Only one particle counter is required in a system in accordance with the present invention. The moving aerosol systems of the prior art require two.

4. It is much easier and more accurate to measure particulate concentration in a stationary aerosol (the present invention) than in a moving one (conventional apparatus).

5. The existing/conventional systems pull an aerosol through a mask, a process that is different from the actual use of a protective mask in which the mask is impacted by its movement through an aerosol.

6. The existing/conventional systems simultaneously compare the impacting particle count (measured upstream of the mask) with the penetration particle count (measured downstream of the mask) even though the penetration particle volume came from a previously encountered impacting volume. In a system pursuant to the present invention, the impacting particle count and the penetration particle count are preferably made on the same particle volume.

7. Conventional systems require that the mask material be impacted during a "rise time" for the aerosol concentration to stabilize before penetration data are taken. This means that standard testing does not measure the efficiency of a new mask but rather one that has been exposed for a period of time to a steady stream of particles. In a system pursuant to the present invention, a rise time is not necessary so that the efficiency of new mask material can be measured immediately after the material is installed.

8. Conventional systems are expensive to purchase and maintain. Systems pursuant to the present invention are likely less than half as expensive and require only routine maintenance.

A device for measuring efficiency of a face mask in blocking particle transmission, where the face mask includes air-permeable sheet material, comprises a container defining a chamber, and a support movably disposed inside the chamber and configured to hold the face mask or a sample of the sheet material. The support is preferably disposed in air-tight sliding engagement with an inner surface of the container at least partially defining or bounding the chamber. A drive is operatively linked to the support for moving the support and the face mask or sample of the sheet material along a predetermined path through the chamber, wherein the chamber contains an aerosol of particles.

Pursuant to another feature of the present invention, the support is configured to maintain the face mask or sample of the sheet material in a predetermined configuration with a predetermined orientation with respect to a direction of motion along the predetermined path.

Pursuant to another feature of the present invention, the device further comprises a particle counter operatively connected to the container for measuring particles per unit volume before and after movement of the support and the facemask or sample of sheet material along the predetermined path.

It is contemplated that the particles are of a predetermined size range, the device further comprising an aerosol generator operatively connected to the container for introducing the particles into the container. Typically, the predetermined path is a straight line or a circular arc. The predetermined path typically lines in a horizontal plane, but the path may include a vertical component. In that case, the support may be moved along the predetermined path under the force of gravity.

The drive may include an electric motor operatively connected to the support for propelling same along the predetermined path. The electric motor may be operatively connected to the support via a tensile member attached to the support, the tensile member being partially would around a spool attached to a rotor shaft of the electric motor, whereby rotation of the rotor shaft and the spool by the electric motor pulls the tensile member and the support along the predetermined path at a desired speed.

In an alternative embodiment of the invention, the electric motor is operatively linked to a threaded rod for rotating same. The threaded rod traverses a matching threaded circular hole in the support, operatively engaging same, and terminates in a rotatable element mounted to the container, whereby rotation of the threaded rod within the matching threaded circular hole causes the support to move along the predetermined path at a desired speed.

Other possible drives include a power transmission linkage in the form of a rack and pinion mechanism, a worm-drive mechanism, or an electric car attached to the support and configured to travel within the chamber. The rack and pinion mechanism includes a pinion gear attached to a rotor shaft of the electric motor and a rack engaging the support.

In a further embodiment of the present invention, the chamber has a shape of a drum, with the electric motor disposed at a center of the drum. A rod is attached to a rotor shaft of the electric motor, while the support is attached to an outer end of the rod. The predetermined path of support movement extends along a circle, the support revolving about the center of the drum and along the predetermined path at a chosen angular velocity, whereby the face mask or the sample of the sheet material impacts aerosol particles.

A method for use in determining efficiency of a face mask in blocking particle transmission, where the face mask includes air-permeable sheet material, comprises attaching the face mask or a sample of the sheet material to a movable support inside a chamber in a container, where the movable support is in air-tight sliding engagement with an inner surface of the container. At least a portion of the chamber on one side of the support and the face mask or sample of the sheet material is filled with an aerosol of particles to an initial concentration. Thereafter the movable support together with the face mask or the sample of the sheet material is propelled along a predetermined path within the chamber from an initial location to a final location at a selected uniform speed. Subsequently a final concentration of particles in a portion of the chamber on a side of the support opposite the one side is measured.

Pursuant to a more particular feature of the present invention, the portion of the chamber initially supplied with the aerosol has a volume that is reduced during the propelling of the movable support together with the face mask or the sample of the sheet material along the predetermined path. The measuring of the concentration of particles after the movement of the support and test object entails measuring concentration of aerosol particles on a side of the support and the face mask or sample of the sheet material opposite the one side.

Preferably the initial location of the support and test object is at one end of the chamber while the final location is at an opposite end of the chamber. In addition, the method preferably comprises measuring the initial concentration prior to the propelling of the movable support along the predetermined path.

The propelling of the movable support may include operating an electric motor operatively connected to the movable support. Other kinds of propulsion may be devised, using, for instance, pressurized hydraulic lines or pneumatic cylinders.

It is contemplated that the method further comprises calculating (i) a concentration of particles that impact the face mask or the sample of the sheet material during motion thereof along the predetermined path and (ii) a concentration of particles that penetrate the face mask or the sample of the sheet material during motion thereof, from the initial concentration and the final concentration of particles in the chamber, geometry of the chamber, and trajectory of the face mask or the sample of the sheet material along the predetermined path.

A forward linear speed of the movable support may be set to a value such that an aerosol flow rate through the face mask or the sample of the sheet material has a desired value given by the product of the forward linear speed and a cross-sectional area of at least a section of the chamber.

The method may further comprise determining a mask penetration ratio R as $R=C \cdot V/(V+V0)$ wherein C is a ratio of the initial concentration to the final concentration, V0 is a volume of air behind the face mask or sample of sheet material at commencement of a test, and V is a volume of air in front of the face mask or sample of sheet material at commencement of the test.

The predetermined path may be vertical or include a vertical component. Then the propelling of the movable support along the predetermined path may occur under the force of gravity.

In accordance with another contemplated feature of the invention, the method further comprises (a) first moving the movable support through an aerosol of given concentration N without the face mask or the sample of sheet material in place, (b) then measuring an aerosol particle concentration N1 remaining in the chamber, (c) subsequently moving the movable support through an aerosol of the same concentration N with the face mask or sample of sheet material in place attached to the movable support, (d) thereafter measuring an aerosol particle concentration N' remaining in the chamber, and (e) determining a penetration ratio R, of transmitted particles to impacting particles, from a counting ratio $C=N'/N$, of remaining particles to initial particles, as $R=N'/N1=N'/N \cdot N/N1=C \cdot N/N1$.

DETAILED DESCRIPTION

Figure 2A:
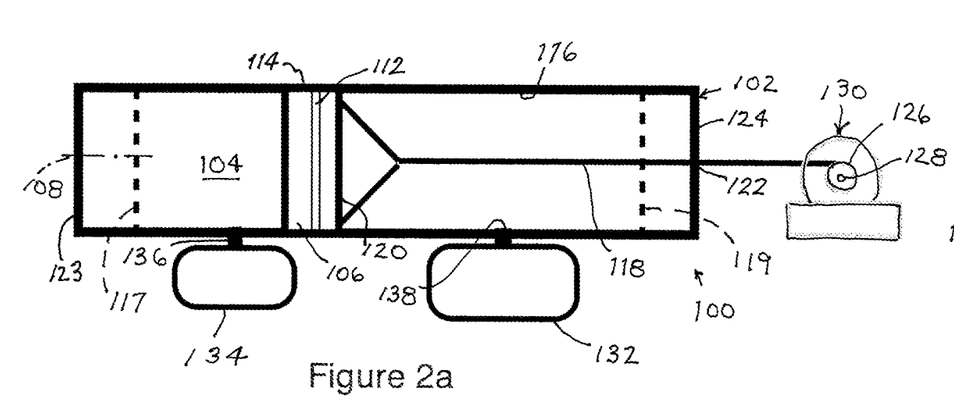
FIG. 2a is schematic longitudinal cross-sectional view of a device for testing the efficacy of a face mask or air filtration material, in accordance with the present invention.

As depicted in FIG. 2a, a device 100 for testing or measuring the efficacy of a face mask or a sample of filter sheet material includes a cylindrical container 102 disposed during use in a horizontal orientation. Container 102 encloses and defines a cylindrical aerosol chamber 104 within which is disposed a concentric annular or ring-shaped shuttle 106 (FIGS. 2a and 2b) that supports or holds mask material 112 in a predetermined orientation and that can slide back and forth along a longitudinal axis 108 of container 102 and chamber 104. Shuttle 106 has an open central aperture 110 across which mask material 112 to be tested is attached. Shuttle 106 has an outer surface 114 provided with a low-friction coating (not separately designated) exemplarily of polytetrafluoroethylene (Teflon) in air-tight sliding engagement with an inner surface 116 of container 102 that at least partially defines or bounds chamber 104. More specifically, shuttle 106 is sufficiently wide and close-fitting to inner surface 116 of container 102 so that only a negligible quantity of encountered aerosol can pass around outer surface 114 as the shuttle slides through chamber 104 along a predetermined path (not separately designated) parallel to and coincident with longitudinal axis 108. A tensile member 118 in the form of a wire or cord (or equivalent) is attached to a front side 120 of shuttle 106 and extends centrally or axially forward through a small hole 122 in forward or circular end plate 124 of container 102. Wire or cord 118 extends forward outside of container 102 and winds around a spool 126 attached to a shaft 128 of a fixed electric motor 130. When motor 130 is engaged, rotation of spool 126 pulls wire of cord 118 and attached shuttle 106 forward in the horizontal direction at a preselected uniform speed. An aerosol generator 132 and a particle counter 134 are connected to container 102 and operatively communicate with chamber 104. An intake port 136 of counter 134 and an outlet 138 of generator 132 are mounted flush with chamber 104 so that they do not interfere with the sliding motion of shuttle 106. Counter 134 may be implemented by an optical detector as in the prior art. Aerosol generator 132 may also have a conventional implementation.

Figure 2B:
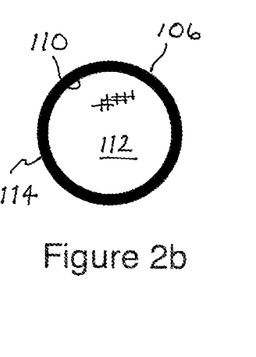
FIG. 2b is a schematic front elevational view of a sliding support included in the device of FIG. 2a, showing a sample of air-permeable face mask material attached thereto.

A testing operation using the device 100 of FIGS. 2a and 2b begins with clamping a mask or mask material 112 to shuttle 106 within aperture 110 (for instance, via a clamping ring, not illustrated) and with shuttle 106 located at one end (say the left end) of chamber 104, at an initial or starting location 117. The aerosol, with airborne or embedded particles, is then released from generator 132 into chamber 104 until particle counter 134 indicates that a particle concentration at a desired value N (particles per cc). (Aerosol drawn into counter 134 during this initial measurement should be returned to chamber 104 so that the concentration is not reduced. The ASTM standard F2299 requires concentrations N less than 102 particles/cc.) Motor 130 is then engaged to pull wire 118 and concomitantly shuttle 106 and the test object 112, namely, a mask or air-permeable sheet material, forward so that the shuttle slides to the right at a desired speed until it is stopped at the other end of chamber 104, at a final or terminal location 119 at end plate 124, and motor 130 stops turning.

A closed cylindrical plug (not shown) could be attached to end plate 124 of container 102 so that aerosol remaining in shuttle 106 on the right-side of the mask material is moved through the material into the volume on the left-side of the material. The concentration N' of the particles remaining to the left of shuttle 106 is then measured by counter 134 and used to evaluate the counting ratio $C=N'/N$. For reasons provided below, counting ratio C may not exactly equal penetration ratio R, in which case a small correction is necessary.

Figure 3A:
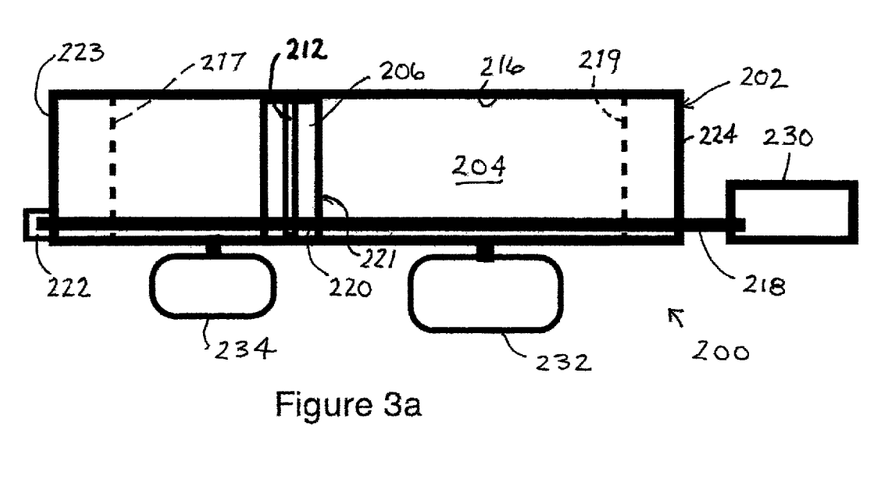
FIG. 3a is schematic longitudinal cross-sectional view of another device for testing the efficacy of a face mask or air filtration material, in accordance with the present invention.
Figure 3B:
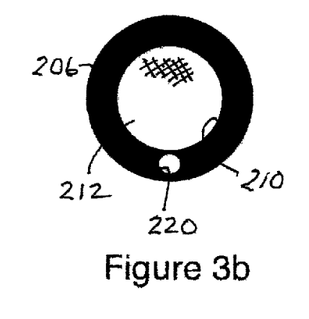
FIG. 3b is a schematic front elevational view of a sliding support included in the device of FIG. 3a, showing a sample of air-permeable face mask material attached thereto.

As illustrated in FIG. 3a, another embodiment of a mask testing device 200 uses an alternative method to propel a mask supporting shuttle 206 in the form of a ring or annulus in a forward, measurement-taking, direction. Shuttle or support ring 206 support is in air-tight sliding engagement with an inner surface 216 of container 202 that at least partially defines or bounds chamber 204. An electric motor 230 rotates a horizontal externally threaded rod 218 that engages an internally threaded hole 220 in shuttle 206 and terminates in a rotatable coupling within an end support 222 attached to a left wall or plate 223 of a container 202 defining a testing chamber 204. After a mask or mask material 212 is clamped to shuttle 206 within an aperture 210 thereof, aerosol is released from a generator 232 into chamber 204. A particle counter 234 indicates that particle concentration within chamber 204 is at desired value N, motor 230 is engaged to rotate threaded rod 218. As rod 218 rotates within threaded hole 220 in shuttle 206, the shuttle moves forward at a desired uniform speed from an initial or starting location 217 until the shuttle is stopped at the right end of chamber 204 at a final or terminal location 219 and motor 230 (rather the rotor thereof, not separately illustrated) stops turning. As when using the device 100 of FIG. 2a, the concentration N' of particles remaining to the left of shuttle 206 is then measured by counter 234 and used to determine counting ratio C=N'/N.

Depending on the details of the operating procedure, the mask or mask material 112, 212 may be clamped to a cylindrical carrier (not shown) which is inserted (e.g. screwed) into aperture 110, 210 and attached to shuttle 106, 206 at the right end (at end plate 124, 224 of chamber 104, 204). The chamber 104, 204 may contain unclean air before the aerosol is introduced. If this initial volume of air contains extraneous particles such as dust or automobile exhaust particles, counter 134, 234 will count these particles in addition to the aerosol particles if the extraneous particles are of the size being studied. If that is the case, and if the testing of a clean new mask or mask material 112, 212 is desired, then the unclean air must be purged from the chamber 104, 204 before the testing begins. This can be done by incorporating an exhaust valve (not shown) on a left wall 123, 223 of chamber 104, 204. A vacuum pump (not shown) is attached to the open valve and used to draw the air out of the chamber 104, 204. The valve would then be closed before the aerosol generator 132, 232 is used to fill chamber 104, 204. Another way to purge chamber 104, 204 is to run shuttle 106, 206 from right to left end with the mask or mask material 112, 212 replaced by a solid disk (not shown) and with the valve (not shown) open.

A procedure for determining the penetration ratio R (the concentration of particles that penetrate the mask material divided by the concentration of particles that impact the mask material) from the counting ratio C=N'/N follows.

If the particle counter 132, 232 used with the mask testing device 100, 200 measures the number of particles per unit volume, then a potential effect exists that must be accounted for in the evaluation of penetration ratios from the counter outputs. As shuttle 106, 206 moves (say from left to right) within chamber 104, 204, essentially all of the air in the chamber (initially to the right of the shuttle 106, 206) moves through the mask material 112, 212 and ends up at the left side of the shuttle. However, it is possible that not all of the particles suspended in the aerosol impact the mask 112, 212 as shuttle 106, 206 moves forward. If front side or forward face 120, 221 of shuttle 106, 206 consists of solid material (such as the surface of a clamp—not shown—that holds a mask 112, 212 in place) in addition to mask material, some of the particles may attach to the solid face material during the test. In addition, some particles may attach to the right-end wall 124, 224 or to other walls of chamber 104, 204. Because of these effects, the penetration ratio R is not necessarily simply the (counting) ratio C of the measured particle concentrations in the chamber 104, 204 after and before the movement of shuttle 106, 206. The necessary correction procedure is derived below.

In order to determine the magnitude of this correction, chamber 104, 204 is first filled with aerosol at a chosen concentration N (particles per cc) and shuttle 106, 206 is then engaged to transverse the length of the chamber at a chosen speed $\underline{v}$ without a mask 112, 212 in place. The particle concentration N1 remaining in chamber 104, 204 will then be measured and recorded. (N1≤N is the concentration of particles that moved through the open mask area, and N−N1 is the concentration of particles that have not moved through the open mask area but have instead attached to solid surfaces during the shuttle motion.) Shuttle 106, 206 is then returned to the left-end starting position or location 117, 217, the chamber 104, 204 will be cleaned, a mask 112, 212 to be tested will be attached to shuttle 106, 206, the particle concentration will be again increased to N, and the shuttle will again be engaged to transverse the length of the chamber at the speed $\underline{v}$. The particle concentration N' remaining in the chamber 104, 204 will then be measured. (N'≤N is the concentration of particles that penetrated the mask.) Assuming that the same concentration N−N1 of particles will again attach to solid surfaces and not impact the mask as was the case when the shuttle moved without the mask in place, the penetration ratio (the number N' of impacting particles that penetrate the mask 112, 212 divided by the total number N1 of impacting particles) can then be evaluated as R=N'/N1. Unless none of the particles became attached to solid surfaces during the shuttle motion, this ratio will be greater than the counting ratio C=N'/N. (R=N'/N1=N'/N·N/N1=C·N/N1.) In general, R will be greater than C, so that the filtration efficiency E=(1−R)·100% will be less than the uncorrected value (1−C)·100%.

For chosen values of N and v, the correction factor R/C=N/N1 will be independent of the mask being tested and will therefore only have to be measured once. However, the factor may depend on N and/or v and, if so, it will have to be measured for each contemplated pair of these quantities. The penetration ratio R and the filtration efficiency E depend in general (through N1) on the geometry of the material holder and the chamber, as well as on measured particle concentrations. However, the setup shown in FIGS. 2a and 3a and the associated testing operations are obviously much simpler to assemble, operate, and regulate than the current systems shown in FIG. 1, with potentially greater accuracy, and at a small fraction of the cost.

Another effect to be accounted for in the evaluation of penetration ratios from the outputs of counter 134, 234 is the possible existence of a volume V0 of clean air behind a mask (or sample of mask sheet material) 112, 212 at the start of a test. This can be accounted for as follows. Let $\underline{V}$ be the volume of air and n be the number of particles to the right of the mask 112, 212 at the start of the test. The measured initial concentration is then N=n/V. Let $\underline{n'}$ be the number of particles to the left of the mask 112, 212 at end of test. Then the measured final concentration is N'=n'/(V+V0), the measured count ratio is C=(n'/(V+V0))/(n/V), and the penetration ratio is:

$$R=n'/n=C\cdot V/(V+V0)=C/(1+V0/V).$$

The penetration ratio is thus the measured count ratio divided by (1+V0/V). $\underline{R}$ is therefore less than $\underline{C}$, making the penetration efficiency E=(1−R)·100% greater than the uncorrected value (1−C)·100%. If both of the above effects are relevant, the penetration ratio would be R=C·(N/N1)/(1+V0/V). Depending on the location of the mask material within the shuttle, there could be a volume of aerosol remaining to the right of the material 112, 212 at the end of the test. This can be accounted for in a similar way.

In the above description of the invented testing apparatus, it is assumed that encountered air molecules can move freely through the mask material 112, 212 so that there is no pressure or particle density buildup to the right of the moving shuttle 106, 206. (Covid 19 particles have diameters greater than about 0.07 um whereas air molecules have diameters less than about 0.003 um.) For testing mask materials that are more resistant to air movement, the size of the chamber 104, 204 must be sufficiently large to prevent such a pressure/density increase. An alternative is to attach a sufficiently large aerosol accumulation chamber at the right end of the main chamber. Another alternative is to incorporate an air exhaust vent at the right end of the chamber.

The electric motor 130, 230 that propels the shuttle or sliding support ring 106, 206 must incorporate a gear mechanism (not shown) that can be used to set the forward linear speed of the sliding ring to a desired value $\underline{v}$. This value, and the value $\underline{A}$ of the cross-sectional area of chamber 104, 204 will determine the value of the aerosol flow rate $\underline{f}$ by the equation $f=v \cdot A$. ($f=85$ L/Min in the NIOSH standard, with an allowed variation of 2.5%. The variation in the present device is 0%.)

The speed v0 with which the mask or mask material 112, 212 impacts the aerosol will then be precisely determined by $\underline{v}$ and the geometry of the mask-material support ring 106, 206. (In the ASTM standard, the impact speed v0 is between 1 and 25 cm/s.) (In the conventional testing operation using a moving aerosol, it is impossible to set the impact speed with such accuracy and uniformity.) The relation between $\underline{v}$ and v0 can be expressed in terms of the diameter $\underline{D}$ of the chamber and the diameter D0 of the mask material. The area of the mask is $a0=(\pi \cdot D0^2)/4$, the area of the chamber cross section is $a=(\pi \cdot D^2)/4$, and the area of the ring is $a-a0$. Let d be the total ring travel distance and let $\underline{t}$ be the total travel time, so that the ring travel speed is $v=d/t$. The volume of the air that goes through the mask is the volume $a \cdot d = a \cdot v \cdot t$ of the chamber. This volume is also given by $a0 \cdot v0 \cdot t$, so that the speed with which the mask impacts the aerosol is $v0=v \cdot a/a0$. (This is an example of the equation of continuity in fluid dynamics.) For a chosen value of v0, the ring speed is thus $v=v0 \cdot a0/a=v0 \cdot (D0/D)^2$. (A similar speed correction is required for the conventional testing apparatus shown in FIG. 1, but this is not mentioned in the available associated literature.)

Because of compression and turbulence within the aerosol as it approaches location of the diameter reduction at the shuttle location, the change in speed from $\underline{v}$ to v0 is not instantaneous. The speed will continuously increase from $\underline{v}$ to v0 to the right and left of the location of the discontinuity. If the cavity or aperture 110, 210 of the shuttle 106, 206 is sufficiently deep (the depth being proportional to shuttle width) and the mask/material 112, 212 is at the left end of the cavity, the impact speed of the aerosol onto the mask/material will be essentially equal to the above v0 value. It is, however, easy to directly measure the speed v0 at the mask 112, 212 as a function of the speed $\underline{v}$ of shuttle or mask-support ring 106, 206. This can be done by attaching a simple digital anemometer at the mask location (with the mask removed) and comparing the displayed aerosol speed v0 with the shuttle speed $\underline{v}$. However, there is no reason to require a value for v0. It is sufficient to require a value for the flow rate $\underline{f}$ because that quantity is simply related to the shuttle speed $v=f/A$.

Motor 130, 230 shown in FIGS. 2a and 3a can be directly attached to the right end wall 124, 224 of container 102, 202 or can be placed within chamber 104, 204. Other ways to move shuttle or mask-support ring 106, 206 forward include using a rack and pinion mechanism with the pinion gear attached to the motor shaft and the rack attached to the shuttle, a similar worm-drive mechanism, or attaching the shuttle to an electric car that travels within the chamber. Other methods for moving the shuttle, including pushing it instead of pulling it, will be apparent to those skilled in the art.

Using the components illustrated in FIG. 1, conventional testing systems involve a number of sources of measurement errors, but measurement inaccuracies associated with these errors are not disclosed in the literature that describes these systems. For example, no advertised particle counters state an accuracy less than +/−5%, so the conventional use of two counters can lead to an error of +/−10%. (The device described herein uses only one counter.) Additional potential errors in the conventional systems include uncertainties in air flow rate values (increasing this rate decreases measured mask efficiency), effects of particle accumulation before testing begins (this usually increases measured mask efficiency), and the use of simultaneously measured upstream and downstream concentrations to evaluate the penetration ratio even though they arise from different aerosol volumes. None of these issues are present in the device described herein. In addition, conventional systems use undisclosed software to "reject bad data" and implement accuracy requirements, but no quantitative measurement uncertainties are stated. Also, the stated efficiency value is the result of averaging over a number of measurements, but the spread in these measurements is not disclosed. The operation manuals state that increased sample times will improve accuracy and repeatability, but they do not state the degree of accuracy and repeatability that they actually provide.

As indicated above, chambers 104 and 204 of FIGS. 2a and 3a may be cylindrical, but other cross-section shapes, such as rectangular or oval, could work as well. As to the sizes or compositions of the particles embedded in the aerosol, ASTM standards F2299 or F3502 use latex beads or NaCl particles of diameter 0.07-5.0 um. The 42 CFR 84 standard uses NaCl or DOP particles of diameter about 0.3 um. The present system, described above, can use particles of any reasonable size or composition.

As to particle generators or aerosol generators 132, 232, many accurate inexpensive models are commercially available. Specific standards (e. g., limits on filtration efficiency values such as 95%), or material properties (e. g., particle size, weight, composition, density, or speed), or controls (e.g., environmental or statistical) are normally designated by test operators or appropriate government agencies (CDC, NIOSH, NIH, etc.). Note to compare the efficiencies of two different masks, it is important that all aspects of the testing equipment and conditions are identical.

The systems illustrated in FIGS. 2a and 3a are embodiments of the basic idea of using a moving mask device instead of a moving aerosol device to simulate the use of a facemask to restrict the flow of harmful air-born particles into the lungs of a person. This system is simple and effective, but there are many other possible embodiments of the idea.

Figure 4:
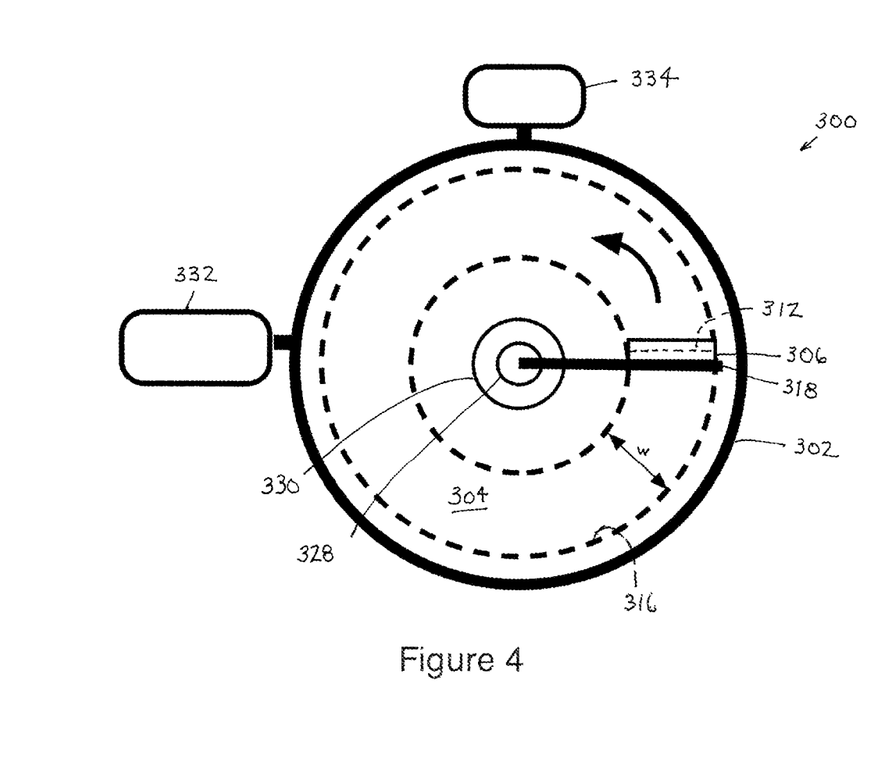
FIG. 4 is a top plan view of a further device for testing the efficacy of a face mask or air filtration material, in accordance with the present invention.

As depicted in FIG. 4, another mask-efficacy testing device 300 moves a mask or mask material 312 and a supporting shuttle or holder 306 through a chamber 304, containing an aerosol, in a circular motion instead of in the above-described linear motion. In a preferred embodiment, an annular or toroidal chamber 304 having a width $\underline{w}$ is defined, that is, enclosed at least in part, by a horizontally oriented drum-shaped container 302. Shuttle or holder 306 support is disposed in air-tight sliding engagement with surrounding inner surfaces 316 of container 302 that define chamber 304. A vertically oriented electric motor 330 is disposed at the center of container 302. As in the previous embodiments, an aerosol generator 332 and a particle counter 334 are connected to container 302 and communicate with chamber 304. The aerosol with embedded particles is released from generator 332 into chamber 304 until particle counter 334 indicates that the particle density is at a desired value N. Motor 330 is then engaged and rotates a rod 318, attached to the motor's rotor shaft 328, in a circular trajectory in a horizontal plane at a chosen angular velocity. Mask material holder or support 306 is attached to rod 318 and oriented vertically so as to impact the particles in the aerosol as the holder or support revolves in a circle centered at rotor shaft 328 of motor 330. The circular motion can be terminated after 1 rotation and the density N' of the particles remaining in chamber 304 is then measured by counter 334 and used to evaluate the ratio N'/N. If all of the N−N' reduced particle density is attributable to the mask or mask material 312, this is the penetration ratio R. To prove this, let V be the (doughnut shaped) volume swept out by the mask material 312 in 1 revolution. The number of particles encountered by the material 312 during the test is then M=V·N, and the number of particles remaining in the volume V at the end of the test is M'=V·N'. The fraction of particles remaining in the volume V over particles encountered in that volume is the penetration ratio R=M'/M=V·N'/V·N=N'/N. Note that in this case R and the filtration efficiency E=(1−R)·100% depend only on the initial and final particle densities.

If during the rotation of mask or mask material 312 some of the encountered particles become attached to mask holder 306, rod 318, or other surfaces, the above expression N'/N for R has to be corrected. The correction can be determined as it was for the first embodiments by measuring the concentration of particles removed from the aerosol when the holder is rotated without mask/material 312 in place. The procedure is the same as before so the details will be omitted here.

As a generalization of the above procedure, mask or mask material 312 can be rotated through more than one revolution. If a specified number n of rotations is used, the volume of aerosol that impacts the mask 312 must be increased from V to n·V, and the other expressions must be similarly generalized.

Figure 5:
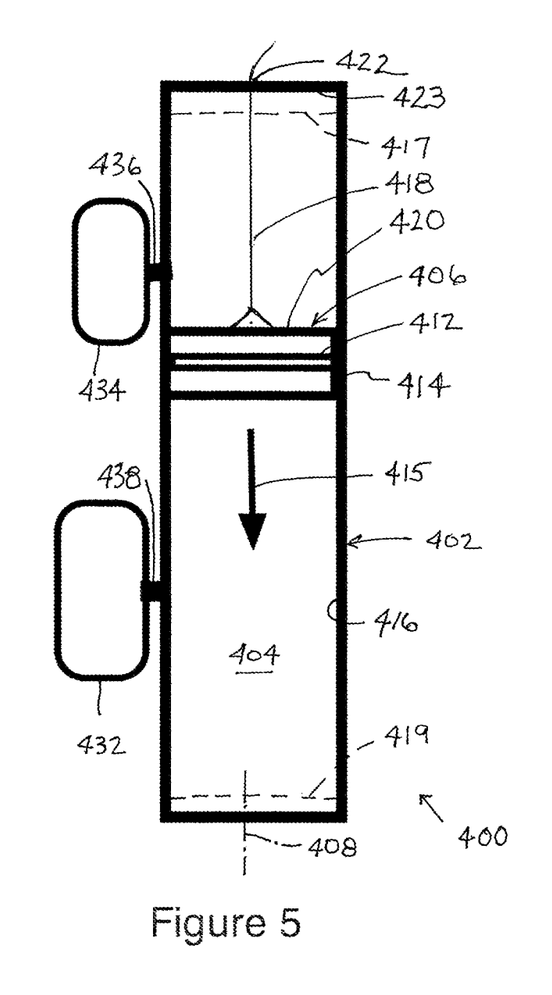
FIG. 5 is a schematic longitudinal cross-sectional view of yet another device for testing the efficacy of a face mask or air filtration material, in accordance with the present invention.

Another system or device 400, illustrated in FIG. 5, uses gravity instead of an electric motor to move mask material 412. Device 400 is similar to device 100 of FIG. 2a, without motor 130 and wire 118, and includes a cylindrical container 402 disposed for use in a vertical orientation. Container 402 encloses and defines a cylindrical aerosol chamber 404 within which is disposed a concentric annular or ring-shaped shuttle 406 that supports or holds mask material 412 in preferably a horizontal orientation. Shuttle 406 can slide up and down along a longitudinal axis 408 of container 402 and chamber 404. Shuttle 406 has an open central aperture (not shown) across which mask material 412 to be tested is attached. Shuttle 406 has an outer surface 414 provided with a low-friction coating (not separately designated) exemplarily of polytetrafluoroethylene (Teflon) in air-tight sliding engagement with an inner surface 416 of container 402. Shuttle 406 is sufficiently wide and close-fitting to inner surface 416 so that only a negligible quantity of encountered aerosol can pass around outer surface 414 as the shuttle slides through chamber 404 along a vertical path (not separately labeled) parallel to and coincident with longitudinal axis 408. During a testing procedure, shuttle 406 slides downwardly under the force of gravity as indicated by an arrow 415. A wire or cord 418 (or equivalent) may be attached to a rear side 420 of shuttle 406 for hoisting shuttle 406 to an initial or starting location 417. Wire or cord 418 extends centrally or axially forward through a small hole 422 in circular end plate 423 of container 402. An aerosol generator 432 and a particle counter 434 are connected to container 402 and operatively communicate with chamber 404. An intake port 436 of counter 434 and an outlet 438 of generator 432 are mounted flush with chamber 404 so that they do not interfere with the sliding motion of shuttle 406. Counter 434 may be implemented by an optical detector as in the prior art. Aerosol generator 432 may also have a conventional implementation.

A testing operation begins with the shuttle 406 attached to container 402 in a location 417 at an upper end of chamber 404. As described above with reference to other embodiments, aerosol is then released from generator 432 into the chamber 404 until particle counter 434 indicates that the particle concentration is at the desired value N. Shuttle 406 is then released so that it slides down chamber 404 until the shuttle reaches a lowermost position 419. The density N' of the particles remaining above the shuttle 406, measured by the counter 434, is then used to evaluate the penetration ratio and the filtration efficiency. In this embodiment, the speed of the moving shuttle 406 is not constant as it was in the embodiment of FIG. 2a, but by appropriately choosing the height h of cylinder 402 and weight of shuttle 406 (to compensate for friction) any desired average speed can be arranged for. In some ways this acceleration of the mask material 412 simulates that of particles accelerating downward after being emitted in a sneeze.

The main inventive idea disclosed herein is to move a mask or a sample of air-permeable sheet material 112, 212, 312, 412 through a chamber 104, 204, 304, 404 containing a stationary particle-imbedded aerosol instead of moving the aerosol through a stationary mask. The decrease in complexity and increase is accuracy achieved by this operational change is immediately apparent by comparison of the proposed equipment shown in FIGS. 2a, 3a, 4, and 5 with the conventional equipment shown in FIG. 1. Several embodiments of this idea have been disclosed above, but other embodiments will be apparent to those skilled in the art. Certain geometries of testing equipment were suggested, but other shapes and sizes are obviously possible. Any use of the above idea to measure the penetration efficiencies of face masks is hereby claimed.

To stabilize shuttle 106, 206 306, 406 and, in particular, to maintain its orientation in a plane perpendicular to its path of motion, one or more guide rods (not illustrated) extending parallel to the shuttle's direction of motion and traversing a longitudinal passageway or hole (not shown) in the shuttle may be provided inside chamber 104, 204, 304, 404, respectively. For example, such a guide rod for device 100 would be eccentrically disposed in container 102, extending parallel to axis 108 of the shuttle 106 and spaced therefrom. In device 200, a single guide extending parallel to threaded rod 218 and in a diametrically opposed location in chamber 204 would suffice.

Although the invention has been described in terms of particular embodiments and applications, one of ordinary skill in the art, in light of this teaching, can generate additional embodiments and modifications without departing from the spirit of or exceeding the scope of the claimed invention. For instance, the embodiments described herein contain only the most basic components necessary for accurate and repeatable mask testing. Other components can however be added if desired or if required by specified standards. For example, an aerosol dryer, a charge neutralizer, a pressure transducer, in-line filters and valves, and/or an external air pump can be incorporated.

It is to be noted that mask or mask material 112, 212, 312, 412 may be attached to the respective shuttle 106, 206, 306, 406 by any suitable means. For instance, the mask or mask material 112, 212, 312, 412 may be glued to a ring (not shown) in turn attached at circumferentially spaced locations on the shuttle body by a plurality of clips or screws (not shown).

As an additional example, chambers 104, 204, 304, 404 are preferably circular in transverse cross-section, that is, in a plane perpendicular to the direction of motion of the respective shuttles 106, 206, 306, 406. However other geometries may be used for chambers 104, 204, 304, 404 and shuttles 106, 206, 306, 406, such as rectangular or oval. One skilled in the art will recognize that other kinds of propulsion mechanisms may be used to move shuttles 106, 206, 306, 406 along their predetermined test paths. Such alternative drives may be pneumatic, hydrostatic, and/or electromagnetic.

Accordingly, it is to be understood that the drawings and descriptions herein are proffered by way of example to facilitate comprehension of the invention and should not be construed to limit the scope thereof.

What is claimed is:

1. A device for measuring efficiency of a face mask in blocking particle transmission, where said face mask includes air-permeable sheet material, comprising:
    a container defining a chamber;
    a support movably disposed inside said chamber and configured to hold said face mask or a sample of said sheet material; and
    a drive operatively linked to said support for moving said support and said face mask or sample of said sheet material along a predetermined path through said chamber, wherein said chamber contains an aerosol of particles.

2. The device defined in claim 1 wherein said drive includes an electric motor operatively connected to said support for propelling same along said predetermined path.

3. The device defined in claim 2 wherein said electric motor is operatively connected to said support via a tensile member attached to said support, said tensile member being partially wound around a spool attached to a rotor shaft of said electric motor, whereby rotation of said rotor shaft and said spool by said electric motor pulls said tensile member and said support along said predetermined path at a desired speed.

4. The device defined in claim 2 wherein said electric motor is operatively linked to a threaded rod for rotating same, said threaded rod traversing a matching threaded circular hole in said support and terminating in a rotatable element mounted to said container, whereby rotation of said threaded rod within said matching threaded circular hole causes said support to move along said predetermined path at a desired speed.

5. The device defined in claim 2 wherein said electric motor is operatively linked to said support via a mechanism taken from a group consisting of a rack and pinion mechanism, a worm-drive mechanism, and an electric car attached to said support and configured to travel within said chamber, said rack and pinion mechanism including a pinion gear attached to a rotor shaft of said electric motor and a rack engaging said support.

6. The device defined in claim 2 wherein said chamber has a shape of a drum, with said electric motor disposed at a center of said drum, a rod being attached to a rotor shaft of said electric motor, said support being attached to an outer end portion of said rod, said predetermined path extending along a circle, said support revolving about said center and along said predetermined path at a chosen angular velocity, whereby said face mask or said sample of said sheet material impacts aerosol particles.

7. The device defined in claim 1 wherein said support is configured to maintain said face mask or sample of said sheet material in a predetermined configuration with a predetermined orientation with respect to a direction of motion along said predetermined path.

8. The device defined in claim 1, further comprising a particle counter operatively connected to said container for measuring particles per unit volume before and after movement of said support and said face mask or sample of sheet material along said predetermined path.

9. The device defined in claim 1 wherein said particles are of a predetermined size range, further comprising an aerosol generator operatively connected to said container for introducing said particles into said container.

10. The device defined in claim 1 wherein said predetermined path is taken from a group consisting of a straight line and a circular arc.

11. The device defined in claim 1 wherein said support is disposed in air-tight sliding engagement with an inner surface of said container at least partially defining or bounding said chamber.

12. A method for use in determining efficiency of a face mask in blocking particle transmission, where said face mask includes air-permeable sheet material, comprising:
    attaching said face mask or a sample of said sheet material to a movable support inside a chamber in a container, where said movable support is in air-tight sliding engagement with an inner surface of said container;
    filling at least a portion of said chamber on one side of said support and said face mask or sample of said sheet material with an aerosol of particles to an initial concentration;
    thereafter propelling said movable support together with said face mask or said sample of said sheet material along a predetermined path within said chamber from an initial location to a final location at a selected speed; and
    subsequently measuring a final concentration of particles in a portion of said chamber on a side of said support opposite said one side.

13. The method defined in claim 12 wherein:
    said portion of said chamber has a volume that is reduced during said propelling said movable support together with said face mask or said sample of said sheet material along said predetermined path; and
    said measuring of said concentration of particles entails measuring concentration of aerosol particles on a side of said support and said face mask or sample of said sheet material opposite said one side.

14. The method defined in claim 13 wherein said initial location is at one end of said chamber and said final location is at an opposite end of said chamber, further comprising measuring said initial concentration prior to said propelling of said movable support along said predetermined path.

15. The method defined in claim 12 wherein said propelling of said movable support includes operating an electric motor operatively connected to said movable support.

16. The method defined in claim 12, further comprising calculating (i) a concentration of particles that impact said face mask or said sample of said sheet material during motion thereof along said predetermined path and (ii) a concentration of particles that penetrate said face mask or said sample of said sheet material during motion thereof, from said initial concentration and said final concentration of particles in said chamber, geometry of said chamber, and trajectory of said face mask or said sample of said sheet material along said predetermined path.

17. The method defined in claim 12 wherein a forward linear speed of said movable support is set to a value such that an aerosol flow rate through said face mask or said sample of said sheet material has a desired value given by said product of said forward linear speed and a cross-sectional area of at least a section of said chamber.

18. The method defined in claim 12 wherein said predetermined path includes a vertical component, said propelling of said movable support along said predetermined path being under said force of gravity.

19. The method defined in claim 12, further comprising:
first moving said movable support through an aerosol of given concentration N without said face mask or said sample of sheet material in place; then measuring an aerosol particle concentration N1 remaining in said chamber;
subsequently moving said movable support through an aerosol of said same concentration N with said face mask or sample of sheet material in place attached to said movable support;
thereafter measuring an aerosol particle concentration N' remaining in said chamber; and
determining a penetration ratio R, of transmitted particles to impacting particles, from a counting ratio $C=N'/N$, of remaining particles to initial particles, as $R=N'/N1=N'/N \cdot N/N1 = C \cdot N/N1$.

20. The method defined in claim 12, further comprising determining a mask penetration ratio R as $R=C \cdot V/(V+V0)$ wherein C is a ratio of said initial concentration to said final concentration, V0 is a volume of air behind said face mask or sample of sheet material at commencement of a test, and V is a volume of air in front of said face mask or sample of sheet material at commencement of said test.

* * * * *